(12) United States Patent
Ogino

(10) Patent No.: US 7,085,488 B2
(45) Date of Patent: Aug. 1, 2006

(54) AUTOMATIC FOCUSING APPARATUS

(75) Inventor: Hiroyuki Ogino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 10/730,786

(22) Filed: Dec. 8, 2003

(65) Prior Publication Data

US 2004/0146291 A1 Jul. 29, 2004

(30) Foreign Application Priority Data

Dec. 10, 2002 (JP) ............................ 2002-358595

(51) Int. Cl.
*G03B 13/36* (2006.01)

(52) U.S. Cl. .......................... 396/133; 348/349

(58) Field of Classification Search ................ 396/101, 396/104, 125–127, 133; 348/349, 353–357
See application file for complete search history.

(56) References Cited

U.S. PATENT DOCUMENTS

| | | | | | |
|---|---|---|---|---|---|
| 4,416,523 A | * | 11/1983 | Kawabata | .................. | 396/104 |
| 4,473,743 A | * | 9/1984 | Ishikawa | .................... | 250/204 |
| 4,523,829 A | * | 6/1985 | Eguchi et al. | ............... | 396/123 |
| 4,561,750 A | * | 12/1985 | Matsumura | .................. | 396/104 |
| 4,617,459 A | * | 10/1986 | Akashi et al. | ............ | 250/201.7 |
| 5,249,058 A | * | 9/1993 | Murata et al. | ............... | 348/354 |
| 5,715,483 A | * | 2/1998 | Omata et al. | .................. | 396/80 |
| 5,995,144 A | * | 11/1999 | Sasakura | .................... | 348/350 |
| 6,549,729 B1 | * | 4/2003 | Robins et al. | .............. | 396/103 |

FOREIGN PATENT DOCUMENTS

| | | |
|---|---|---|
| JP | 2708904 | 10/1997 |
| JP | 10257377 | 9/1998 |

* cited by examiner

*Primary Examiner*—W. B. Perkey
(74) *Attorney, Agent, or Firm*—Morgan & Finnegan, LLP

(57) ABSTRACT

This invention has as its object to execute an optimal automatic focusing operation in both a case that attaches an importance on the focusing precision, and a case that attaches an importance on quick photographing. To this end, an apparatus includes a focus lens used to make focus adjustment of an object image, a motor and focus lens drive circuit for driving the focus lens, and an image sensing element for converting an object image formed by the focus lens into an electrical signal, and extracts a signal that represents the high-frequency component of a luminance signal of an object from the output signal of the image sensing element.

13 Claims, 16 Drawing Sheets

F I G. 15
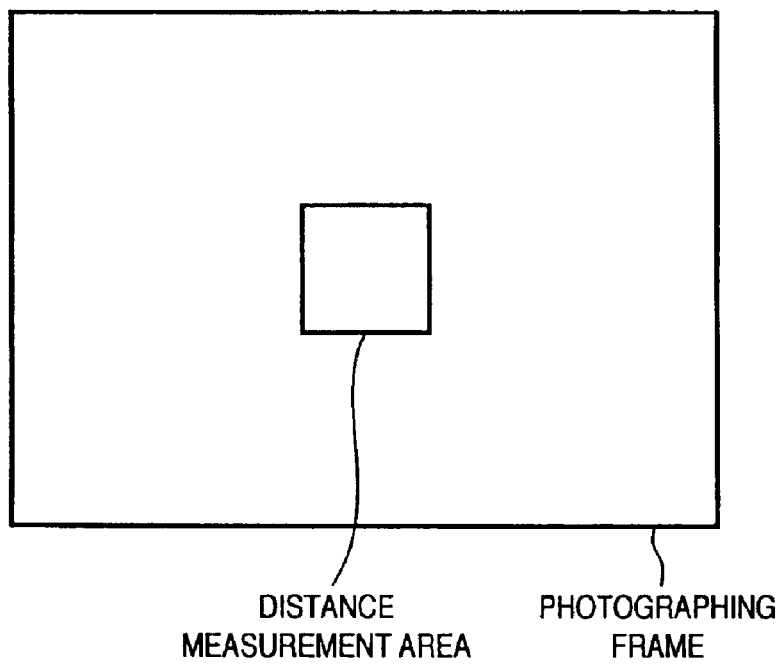

AUTOMATIC FOCUSING APPARATUS

FIELD OF THE INVENTION

The present invention relates to an automatic focusing apparatus which is suitably used in an image recording apparatus such as a digital still camera or the like.

BACKGROUND OF THE INVENTION

Conventionally, among methods of determining a lens position corresponding to a maximum high-frequency component of a luminance signal obtained from an image sensing element such as a CCD or the like as an in-focus position used in digital still cameras, video cameras, and the like, a hill-climbing method that acquires a high-frequency component of a luminance signal (focus evaluation value) obtained from the image sensing element while moving a focus lens, and determining a position corresponding to a maximum focus evaluation value as an in-focus position by moving the focus lens in a direction to increase the focus evaluation value, and a full-area scan method that stores focus evaluation values while driving the focus lens over the entire distance measurement range, and determining a focus lens position corresponding to a maximum value of the stored values as an in-focus position, are known.

In these methods, the central portion of the image sensing frame is set as a distance measurement area, as shown in FIG. 15, and a focus lens position corresponding to a maximum focus evaluation value for an object within this range is determined as an in-focus position. The relationship between the focus lens position and focus evaluation value obtained in this way forms a mountain-like pattern, as shown in FIG. 16.

Japanese Patent No. 2,708,904 discloses an example of the method of storing focus evaluation values while moving the focus lens over the entire distance measurement range. In this example, the focus lens is moved in coarse steps from the infinity end to the closest end to acquire focus evaluation values at respective step positions. Then, the focus lens is moved in fine steps in the vicinity of the focus lens position corresponding to a maximum one of the acquired focus evaluation values to acquire focus evaluation values at respective step positions.

Japanese Patent Laid-Open No. 10-257377 discloses an image sensing apparatus which comprises first focus detection means for detecting an in-focus point while stepping a focus lens by a first drive amount, and second focus detection means for detecting an in-focus point while stepping the focus lens by a second drive amount smaller than the first drive amount, and locates the focus lens at an in-focus point detected by the first focus detection means in a normal image sensing mode or detected upon operating the second focus detection means within a predetermined range that includes an in-focus point detected by the first focus detection means in a high-image quality mode.

However, the method disclosed in Japanese Patent No. 2,708,904 is not suitable for a case wherein a focusing operation is to be quickly completed, since it scans twice per focusing operation.

Also, with the method disclosed in Japanese Patent Laid-Open No. 10-257377, since the focus detection operation is changed by switching the image sensing mode, the user must switch the image sensing mode when he or she wants to quickly complete a focusing operation, or when he or she wants to improve the focusing precision, resulting in troublesome operations.

SUMMARY OF THE INVENTION

The present invention has been made in consideration of the above situation, and has as its object to execute an optimal automatic focusing operation in both a case that attaches an importance on the focusing precision, and a case that attaches an importance on quick photographing.

In order to achieve the above object, according to the first aspect of the present invention, there is provided an automatic focusing apparatus comprising a focus lens used to make focus adjustment of an object image, a focus lens drive device which drives the focus lens, a photoelectric conversion device which converts an object image formed by the focus lens into an electrical signal, an extraction device which extracts a signal that corresponds to a high-frequency component of a luminance signal of an object from an output signal of the photoelectric conversion device, and a control device which makes a scan operation that stores outputs from the extraction device at respective step positions while driving the focus lens in predetermined steps within a focusing range, and extracts a first position corresponding to the stored outputs of the extraction device, and driving the focus lens to the first position obtained by the scan operation, wherein the control device changes the number of times of the scan operation in accordance with a state of an instruction device which instructs to start a photographing operation.

According to the second aspect of the present invention, there is provided a method for making an image recording apparatus execute an automatic focusing process, the image recording apparatus comprising a focus lens used to make focus adjustment of an object image, a focus lens drive device which drives the focus lens, a photoelectric conversion device which converts an object image formed by the focus lens into an electrical signal, an extraction device which extracts a signal that represents a high-frequency component of a luminance signal of an object from an output signal of the photoelectric conversion device, and an instruction device which instructs to start a photographing operation, the program comprising: making a scan operation that stores outputs from the extraction device at respective step positions while driving the focus lens in predetermined steps within a focusing range, and extracts a first position corresponding to the stored outputs of the extraction device, executing a process for driving the focus lens to the first position obtained by the scan operation, and changing the number of times of the scan operation in accordance with a state of the instruction device.

According to the third aspect of the present invention, a computer readable storage medium stores a program actualizes the above method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 15 is a view for explaining an example in which the central portion of the image sensing frame is set as a distance measurement area.

DETAILED DESCRIPTION OF THE PREFERRED EMBODIMENTS

Preferred embodiments of an automatic focusing apparatus according to the present invention will be described hereinafter with reference to the accompanying drawings.

(First Embodiment)

Figure 1:
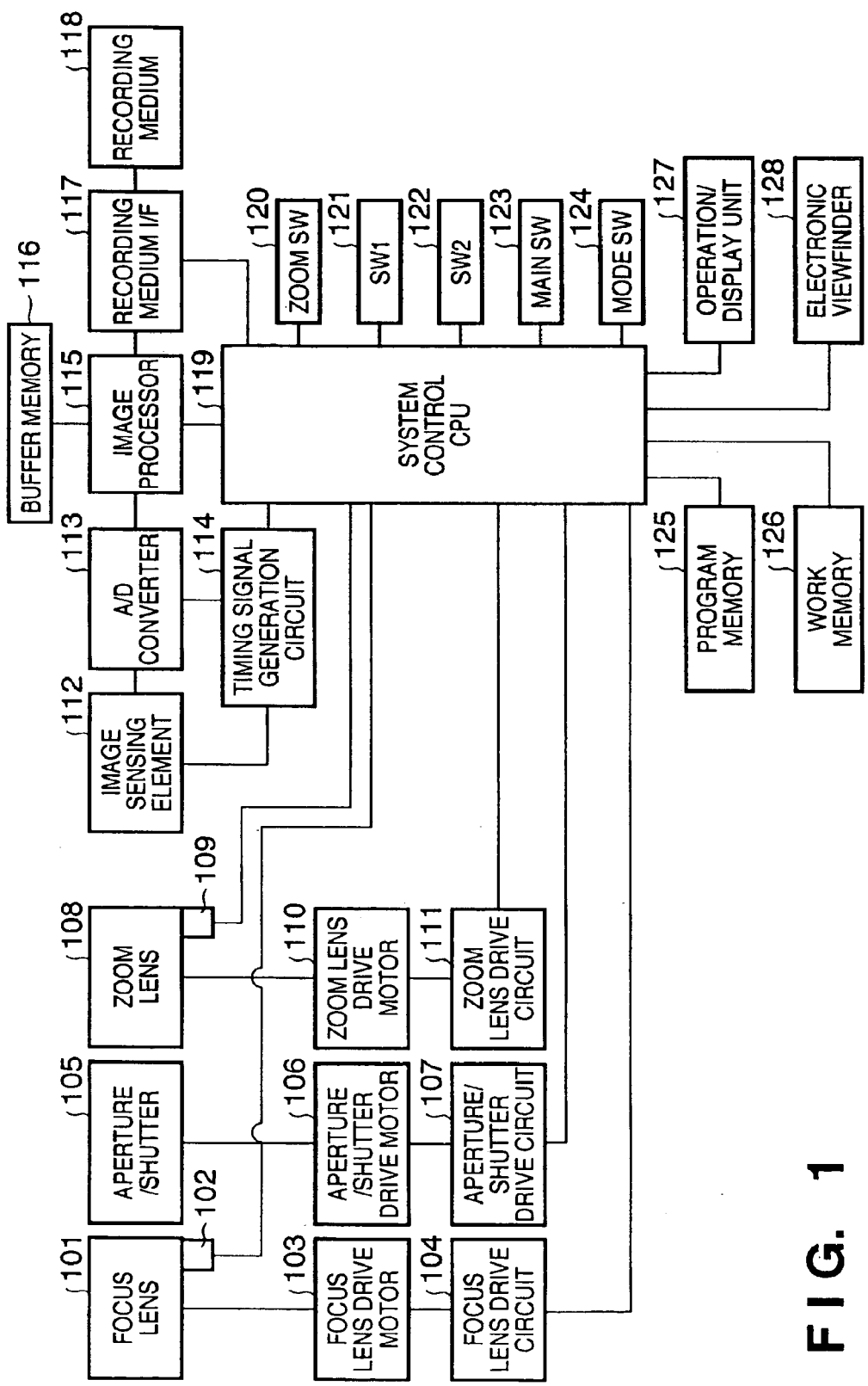
FIG. 1 is a block diagram showing the arrangement of a digital camera according to an embodiment of the present invention.

FIG. 1 is a block diagram of a digital camera as an image recording apparatus to which an automatic focusing apparatus according to the present invention is applied. Reference numeral 101 denotes a focus lens used to adjust a focus on an image sensing element 112 (to be described later); 102, a photointerrupter for detecting the initial position of the focus lens 101; 103, a motor for driving the focus lens 101; and 104, a focus lens drive circuit for supplying a drive signal to the motor 103 to drive the focus lens 101.

Reference numeral 105 denotes light control members including an aperture, shutter, and the like; 106, a motor for driving the aperture/shutter 105; and 107, an aperture/shutter drive circuit for supplying a drive signal to the motor 106 to drive the aperture/shutter 105.

Reference numeral 108 denotes a zoom lens for changing the focal length of a photographing lens; 109, a photointerrupter for detecting the initial position of the zoom lens 108; 110, a motor for driving the zoom lens 108; and 111, a zoom lens drive circuit for supplying a drive signal to the motor 110 to drive the zoom lens 108.

Reference numeral 112 denotes an image sensing element for converting light reflected by an object into an electrical signal; 113, an A/D converter for converting an analog signal output from the image sensing element 112 into a digital signal; and 114, a timing signal generation circuit (to be referred to as a TG hereinafter) for generating timing signals required to operate the image sensing element 112 and A/D converter 113.

Reference numeral 115 denotes an image processor for applying a predetermined process to image data input from the A/D converter 113; 116, a buffer memory for temporarily storing the image data processed by the image processor 115; 117, an interface for connecting a recording medium 118 (to be described below); and 118, a recording medium such as a memory card, hard disk, or the like.

Reference numeral 119 denotes a micro controller (to be referred to as a CPU hereinafter) for controlling the system such as a photographing sequence and the like.

Reference numeral 120 denotes a zoom SW used to input zoom start and stop instruction signals to the CPU 119; 121, a standby switch (to be referred to as SW1 hereinafter) used to start photographing standby operations such as AF (Automatic Focusing), AE (Automatic Exposure), and the like; 122, a photographing switch (to be referred to as SW2 hereinafter) used to start photographing and recording operations after operation of the photographing standby switch 121; 123, a main switch used to turn on the power supply of the system; and 124, a mode switch used to set an operation mode of the camera.

Reference numeral 125 denotes a program memory for storing programs to be executed by the CPU 119; and 126, a work memory in and from which the CPU 119 writes and reads out various data required upon executing processes according to the programs stored in the program memory 125.

Reference numeral 127 denotes an operation/display unit for displaying the operation states of the camera and various warnings; and 128, an electronic viewfinder (to be referred to as an EVF hereinafter) for displaying an image.

The basic operation in the image recording apparatus according to this embodiment will be described below with reference to the flow chart in FIG. 2. The state of SW1 is checked in step S201. If SW1 is ON, the flow advances to step S205; otherwise, the flow advances to step S202.

In step S202, an AE operation is made to obtain an appropriate luminance level of an image displayed on the EVF 128 by controlling the aperture 105 and shutter speed. In step S203, an auto white balance (AWB) operation is executed to obtain an appropriate color balance of an image displayed on the EVF 128 irrespective of the color temperature of a light source. In step S204, a predetermined process is applied to an image signal read out from the image sensing element 112, and the processed image is displayed on the EVF 128.

In step S205, a photographing process is executed according to a sequence to be described below.

Figure 2:
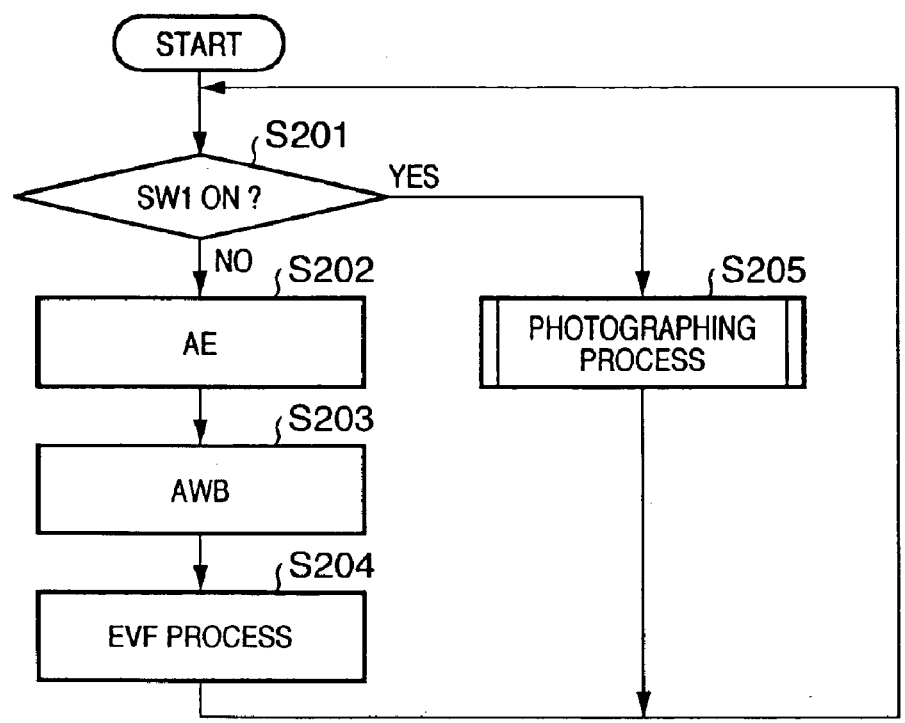
FIG. 2 is a flow chart showing the basic operation of the digital camera.
Figure 3:
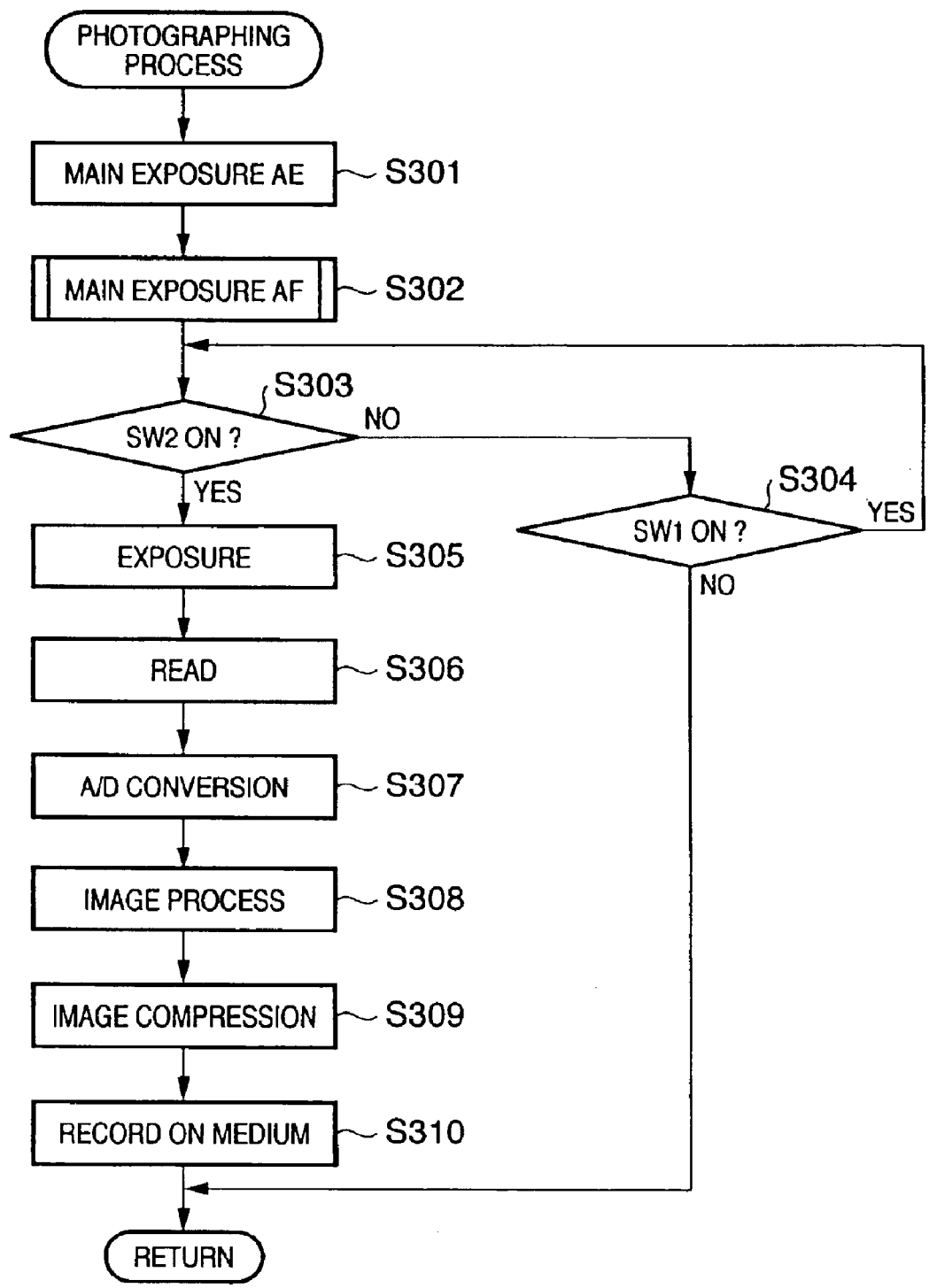
FIG. 3 is a flow chart showing a photographing process.

FIG. 3 is a flow chart for explaining the photographing process in step S205 in FIG. 2. In step S301, a main exposure AE operation is executed. In step S302, a main exposure AF operation is executed in accordance with a sequence to be described later. In step S303, the state of SW2 is checked. If SW2 is ON, the flow advances to step S305; otherwise, the flow advances to step S304.

In step S304, the state of SW1 is checked. If SW1 is ON, the flow returns to step S303; otherwise, the control exits the photographing process.

In step S305, the image sensing element 112 is exposed. In step S306, data accumulated on the image sensing element 112 is read out. In step S307, the A/D converter 113 converts an analog signal read out from the image sensing element 112 into a digital signal. In step S308, the image processor 115 executes various image processes. In step S309, the image processed in step S308 is compressed according to a format such as JPEG or the like. In step S310, the data compressed in step S309 is transferred to the recording medium 118 such as a memory card or the like inserted in the camera main body via the recording medium interface 117.

Figure 4:
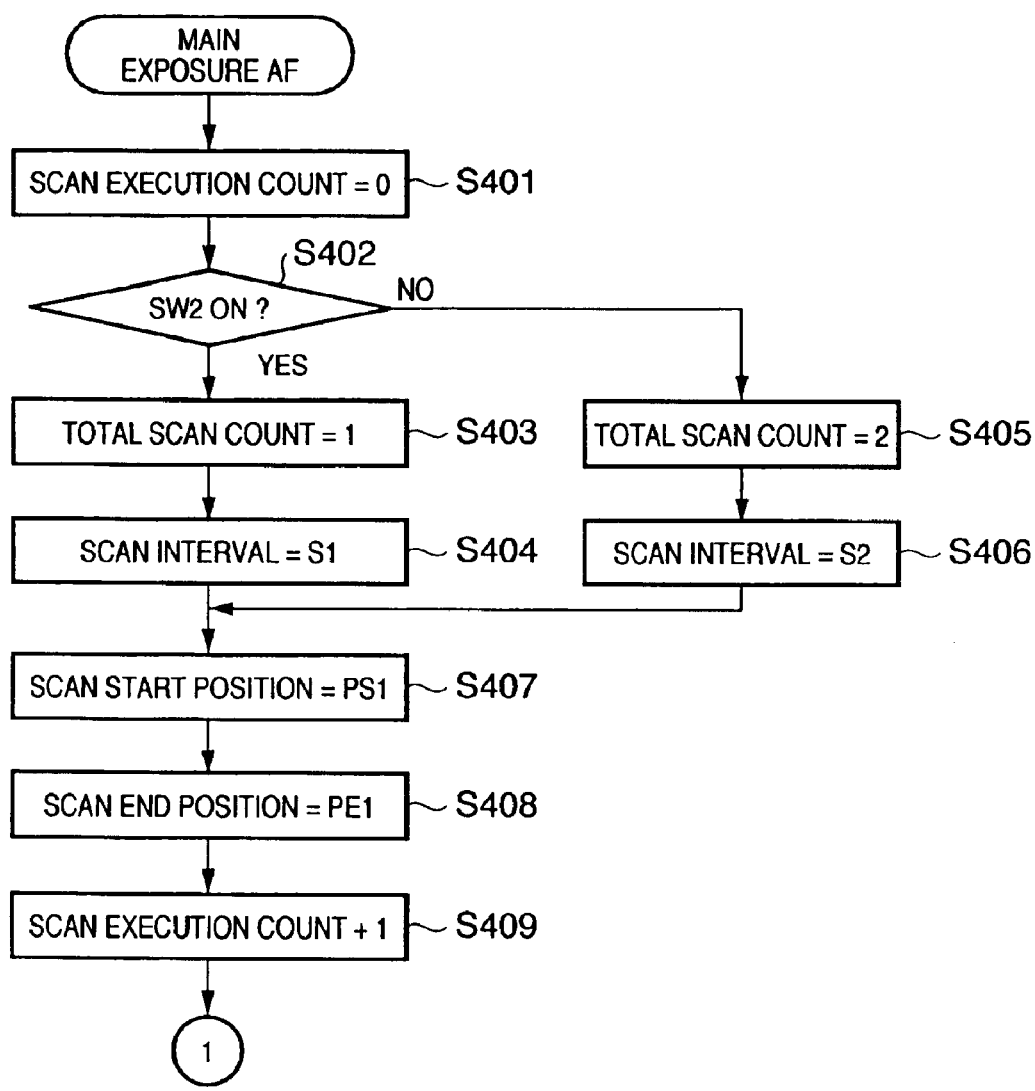
FIG. 4 is a flow chart showing an AF operation for main exposure according to the first embodiment.
Figure 5:
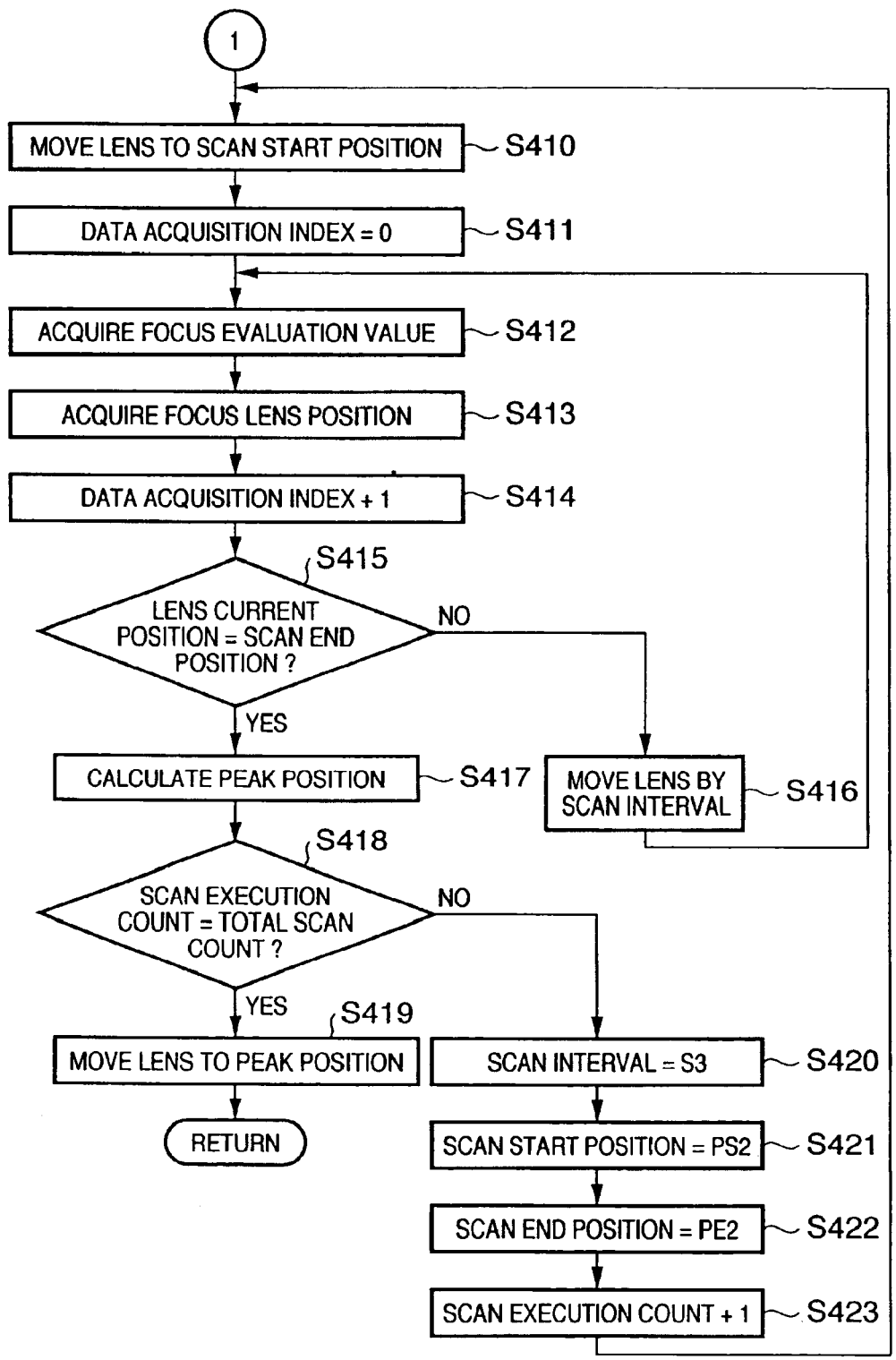
FIG. 5 is a flow chart showing an AF operation for main exposure according to the first embodiment.

FIGS. 4 and 5 are flow charts for explaining the main exposure AF operation in step S302 in FIG. 3. In step S401, a scan execution count is reset to zero. Note that the scan execution count indicates the order of the current scan in a plurality of scans.

In step S402, the state of SW2 is checked. If SW2 is ON, the flow advances to step S403; otherwise, the flow advances to step S405.

In step S403, a total scan count is set to be 1. Note that the total scan count indicates the number of scans executed per AF operation. In step S404, a scan interval is set to be S1. The method of setting S1 will be described later.

In step S405, the total scan count is set to be 2. In step S406, the scan interval is set to be S2. The method of setting S2 will also be described later.

In step S407, a scan start position is set to be PS1. In step S408, a scan end position is set to be PE1. The method of setting PS1 and PE1 will be described later. In step S409, the scan execution count is incremented by 1.

A description will continue with reference to FIG. 5. In step S410, the focus lens 101 is moved to the scan start position. Note that the scan start position is PS1 set in step S407 or PS2 to be set in step S421 to be described later.

In step S411, a data acquisition index is reset to zero. Note that the data acquisition index indicates a data acquisition count, and the order of acquired data.

In step S412, the A/D converter 113 converts an analog video signal read out from the image sensing element 112 into a digital signal. The image processor 115 extracts a high-frequency component of a luminance signal from the output from the A/D converter 113, and stores it as a focus evaluation value in the work memory 126.

In step S413, the current position of the focus lens 101 is acquired, and is stored in the work memory 126.

In step S414, the data acquisition index is incremented by 1. The data of the focus evaluation value acquired in step S412 and the focus lens position acquired in step S413 are stored in association with the data acquisition index. For example, the focus evaluation value acquired at the third acquisition timing is that at the focus lens position acquired at the third acquisition timing, and the data acquisition index at that time is 3.

It is checked in step S415 if the current position of the focus lens 101 is equal to the scan end position. If YES in step S415, the flow advances to step S417; otherwise, the flow advances to step S416. Note that the scan end position is PE1 set in step S408 or PE2 to be set in step S422 to be described later.

In step S416, the focus lens 101 is moved by the scan interval toward the scan end position, and the flow then returns to step S412. Note that the scan interval is set in step S404 or S406, or in step S420 to be described later.

In step S417, a maximum one of the focus evaluation values stored in the work memory 126 in step S412 is extracted, and the focus lens position associated using the same data acquisition index as that of the extracted focus evaluation value, i.e., the focus lens position indicating the peak of the focus evaluation value, is calculated.

It is checked in step S418 if the scan execution count is equal to the total scan count set in step S403 or S405. If YES in step S418, the flow advances to step S419; otherwise, the flow advances to step S420.

In step S419, the focus lens 101 is moved to the peak position calculated in step S417, thus ending the process.

In step S420, the scan interval is set to be S3. The method of setting S3 will be described later. In step S421, the scan start position is set to be PS2. In step S422, the scan end position is set to be PE2. The method of setting PS2 and PE2 will be described later. In step S423, the scan execution count is incremented by 1, and the flow returns to step S410.

Figure 6:
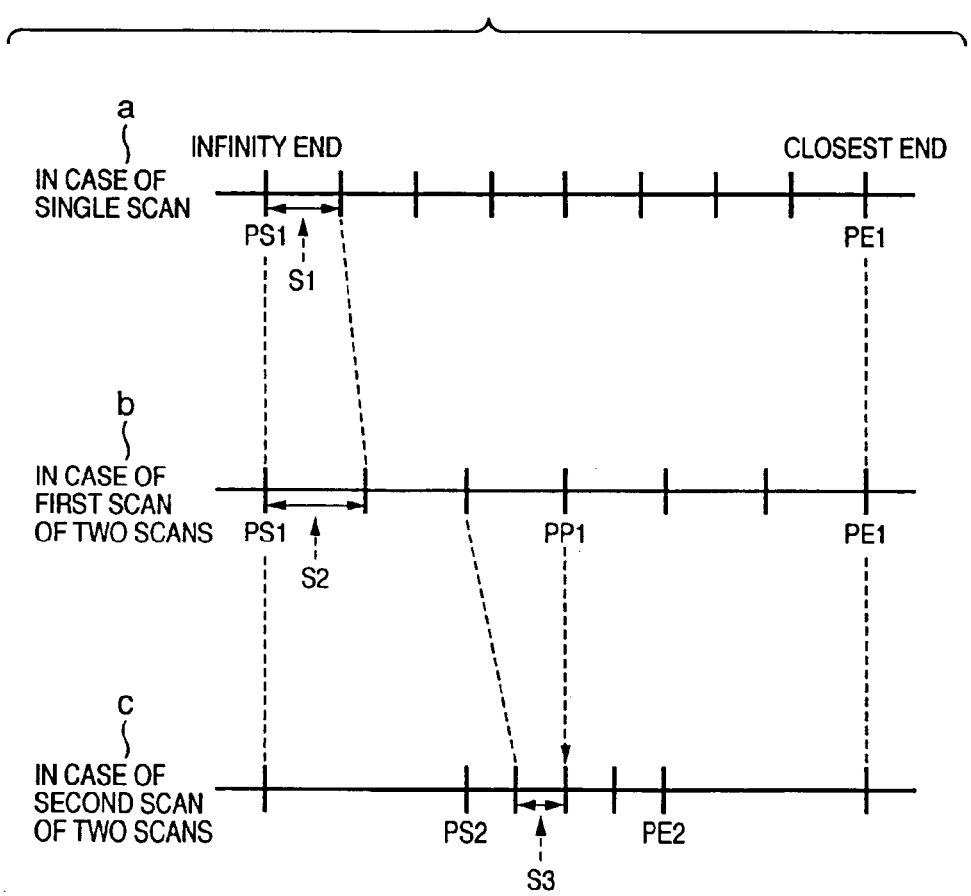
FIG. 6 is a view for explaining the scan start position, scan end position, and scan intervals.

The AF operation of the digital camera, which is executed according to the flow charts of FIGS. 4 and 5, will be explained below using FIG. 6. Initially, when SW1 is turned on to execute the photographing process, and the AF operation starts, the state of SW2 is detected upon starting the AF operation, as described in step S402 in FIG. 4.

If SW2 is ON, it is determined that SW1 and SW2 are pressed at a stroke, i.e., that the photographer wants to complete a photographing operation quickly. Hence, the process for completing the AF operation within a short period of time is executed.

In this case, the total scan count is set to be 1, as described in step S403 in FIG. 4, so as to complete the AF operation by a single scan. The scan interval at this time is set to be S1, as indicated by a in FIG. 6. This S1 is set in step S404 in FIG. 4. The scan start position is set at a position where an object at the infinity position is in focus (this position will be referred to as the infinity end) as PSi. The scan end position is set at a position where an object at the closest distance is in focus (this position will be referred to as the closest end) as PE1. These PS1 and PE1 are set in steps S407 and S408 in FIG. 4.

After these setups are done, the focus evaluation value and the current position of the focus lens 101 are acquired at the scan start position, and the focus lens 101 is driven by S1 toward the scan end position PE1. This process is repeated until the focus lens 101 reaches the scan end position PE1. When the focus lens 101 has reached the scan end position PE1, a maximum one of the acquired focus evaluation values is extracted, and the position of the focus lens 101 associated using the same data acquisition index as that upon acquiring that focus evaluation value is determined as a focus peak position. Then, the focus lens 101 is moved to that position, thus ending the AF operation.

On the other hand, if SW2 is not ON upon starting the AF operation, it is determined that the photographer wants to take a shot without haste while attaching an importance on the focusing precision. Hence, the process for improving the focusing precision is executed.

In this case, the total scan count is set to be 2, as described in step S405 in FIG. 4, so as to complete the AF operation in two scans. The scan interval of the first scan at that time is set to be S2, as indicated by b in FIG. 6. This S2 is set in step S406 in FIG. 4. The scan start position is set at the infinity end PS1, and the scan end position is set at the closest end PE1. These PS1 and PE1 are set in steps S407 and S408 in FIG. 4.

After these setups are done, the focus evaluation value and the current position of the focus lens 101 are acquired at the scan start position, and the focus lens 101 is driven by S2 toward the scan end position PE1. This process is repeated until the focus lens 101 reaches the scan end position PE1. When the focus lens 101 has reached the scan end position PE1, a maximum one of the acquired focus evaluation values is extracted, and the position of the focus lens 101 associated using the same data acquisition index as that upon acquiring that focus evaluation value is determined as a focus peak position.

If PP1 represents this focus peak position, the second scan is made to have, as a scan range, the range for a predetermined amount in each of the infinity and closest directions with this PP1 as the center. That is, a position which is separated the predetermined amount from PP1 toward the infinity end is set as the scan start position PS2, and a position which is separated the predetermined amount from PP1 toward the closest end is set as the scan end position PE2, as indicated by c in FIG. 6. The scan interval is S3.

After these setups are done, the focus evaluation value and the current position of the focus lens 101 are acquired at the scan start position PS2, and the focus lens 101 is driven by S3 toward the scan end position PE2. This process is repeated until the focus lens 101 reaches the scan end position PE2. When the focus lens 101 has reached the scan end position PE2, a maximum one of the acquired focus evaluation values is extracted, and the position of the focus lens 101 associated using the same data acquisition index as that upon acquiring that focus evaluation value is determined as a focus peak position. Then, the focus lens 101 is driven to that position, thus ending the AF operation.

At this time, the scan intervals meet S2>S1>S3. That is, the scan interval upon completing the AF operation in a single scan is set to be smaller than that of the first scan upon completing the AF operation in two scans. Also, the scan interval of the second scan upon completing the AF operation in two scans is set to be smaller than that upon completing the AF operation in a single scan.

By executing the AF operation with these setups, when SW2 is ON upon starting the AF operation, a scan is made only once at relatively coarse scan intervals to complete the AF operation. Hence, the AF operation can be quickly completed, and a quick photographing operation can be consequently made.

When SW2 is not ON upon starting the AF operation, after the first scan is made at scan intervals coarser than those in the single scan, the second scan is made at fine scan intervals to have the focus peak position detected by the first scan as the center, thus allowing the AF operation with high precision.

Note that the scan interval upon making the single scan may be set to be equal to that of the first scan upon making two scans.

(Second Embodiment)

In the above description, the state of SW2 is checked upon starting the AF operation, and the scan count is then set. Alternatively, the state of SW2 may be checked during the AF operation. The operation of such embodiment will be explained below.

Figure 7:
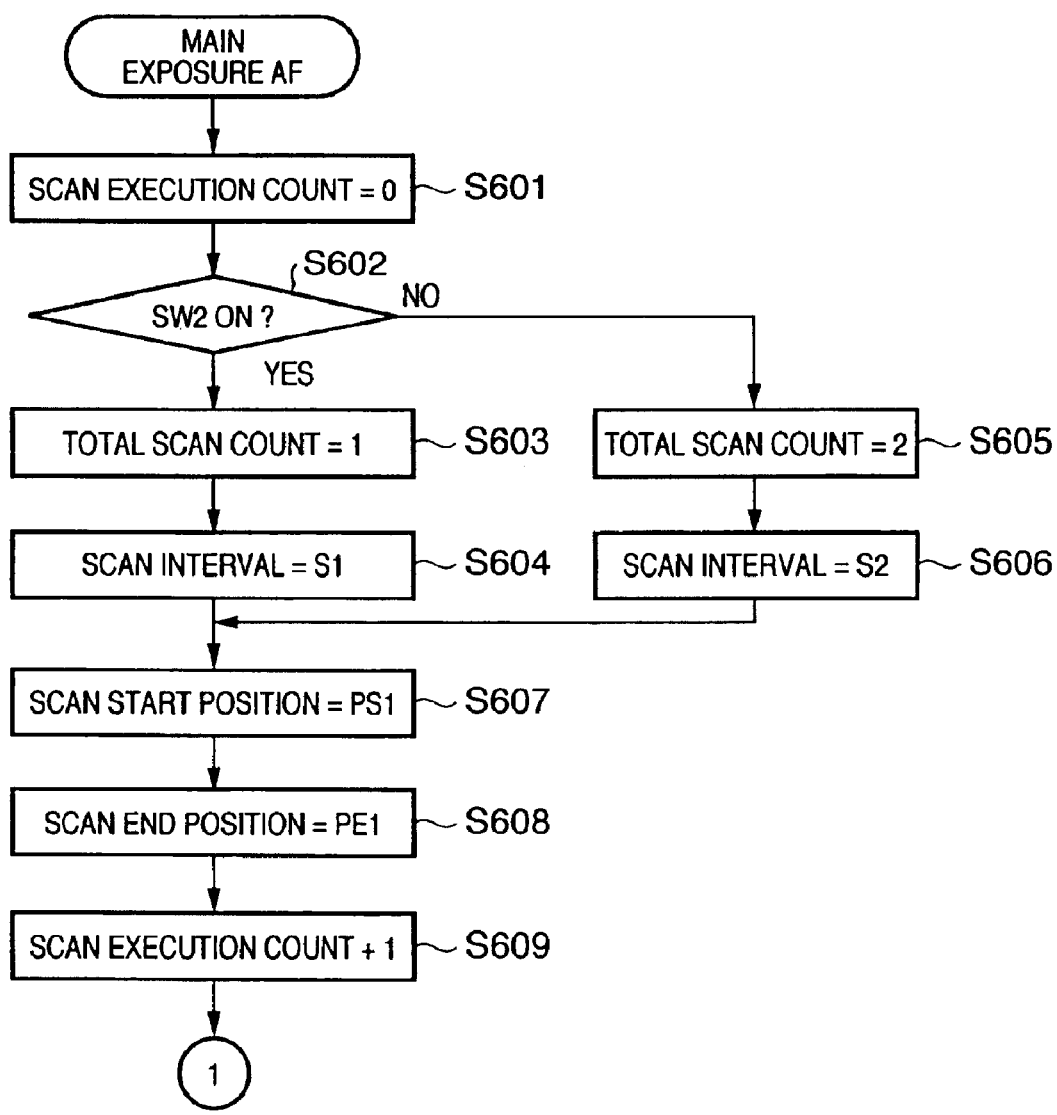
FIG. 7 is a flow chart showing an AF operation for main exposure according to the second embodiment.
Figure 8:
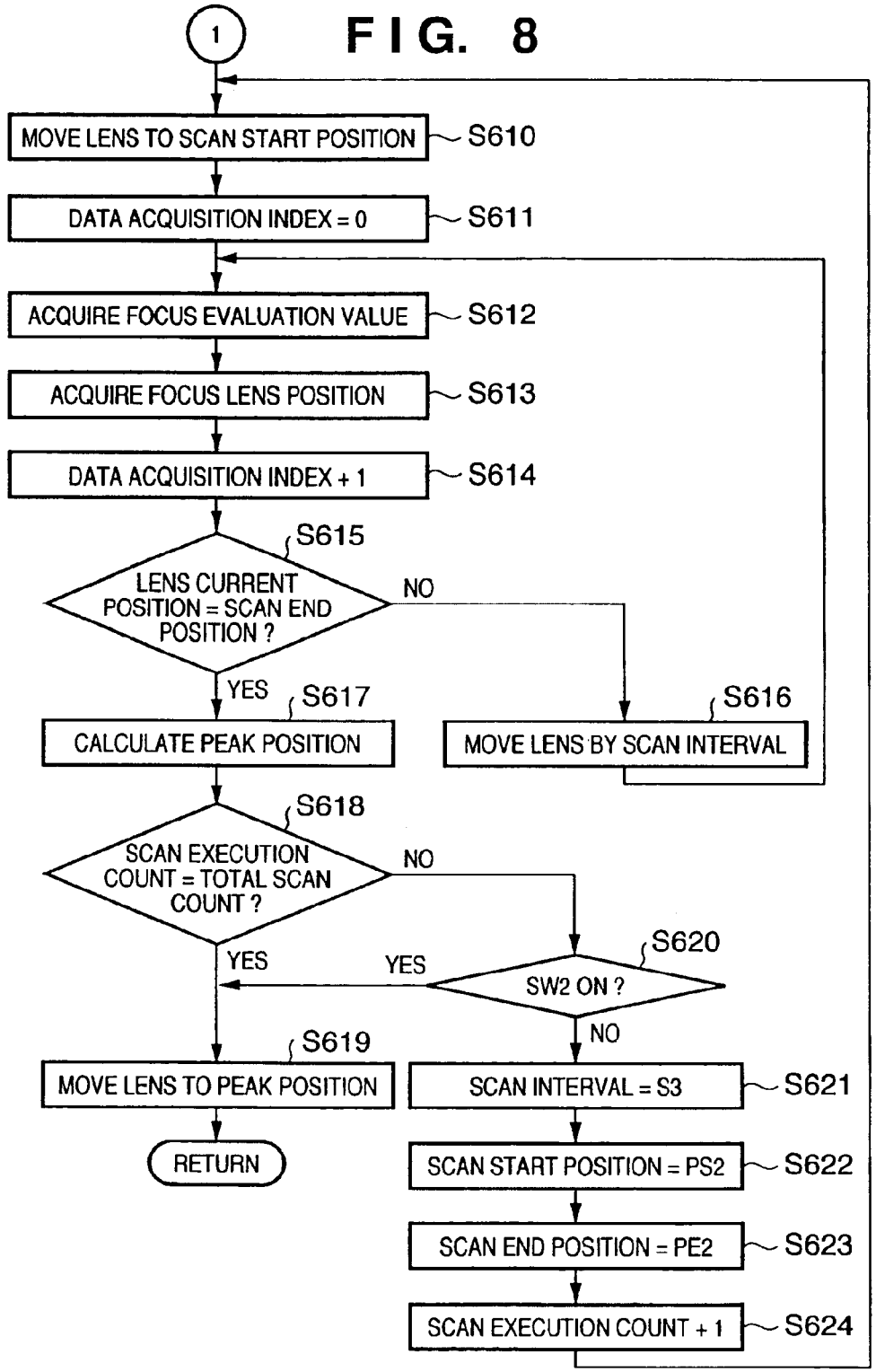
FIG. 8 is a flow chart showing an AF operation for main exposure according to the second embodiment.

FIGS. 7 and 8 are flow charts for explaining the main exposure AF operation in step S302 in FIG. 3. In step S601, a scan execution count is reset to zero. Note that the scan execution count indicates the order of the current scan in a plurality of scans as well as that set in step S401 in FIGS. 4 and 5 in the first embodiment.

In step S602, the state of SW2 is checked. If SW2 is ON, the flow advances to step S603; otherwise, the flow advances to step S605.

In step S603, a total scan count is set to be 1. Note that the total scan count indicates the number of scans executed per AF operation as well as that set in step S403 in FIGS. 4 and 5 in the first embodiment. In step S604, a scan interval is set to be S1. The method of setting S1 is the same as that described in the first embodiment using FIG. 6.

In step S605, the total scan count is set to be 2. In step S606, the scan interval is set to be S2. The method of setting S2 is also the same as that described in the first embodiment using FIG. 6.

In step S607, a scan start position is set to be PS1. In step S608, a scan end position is set to be PE1. The method of setting PS1 and PE1 is the same as that described in the first embodiment using FIG. 6. In step S609, the scan execution count is incremented by 1.

A description will continue with reference to FIG. 8. In step S610, the focus lens 101 is moved to the scan start position. Note that the scan start position is PS1 set in step S607 or PS2 to be set in step S622 to be described later.

In step S611, a data acquisition index is reset to zero. Note that the data acquisition index indicates a data acquisition count, and the order of acquired data as well as that described in step S411 in FIGS. 4 and 5 in the first embodiment.

In step S612, the A/D converter 113 converts an analog video signal read out from the image sensing element 112 into a digital signal. The image processor 115 extracts a high-frequency component of a luminance signal from the output from the A/D converter 113, and stores it as a focus evaluation value in the work memory 126.

In step S613, the current position of the focus lens 101 is acquired, and is stored in the work memory 126.

In step S614, the data acquisition index is incremented by 1. The data of the focus evaluation value acquired in step S612 and the focus lens position acquired in step S613 are stored in association with the data acquisition index. For example, the focus evaluation value acquired at the third acquisition timing is that at the focus lens position acquired at the third acquisition timing, and the data acquisition index at that time is 3.

It is checked in step S615 if the current position of the focus lens 101 is equal to the scan end position. If YES in step S615, the flow advances to step S617; otherwise, the flow advances to step S616. Note that the scan end position is PE1 set in step S608 or PE2 to be set in step S623 to be described later.

In step S616, the focus lens 101 is moved by the scan interval toward the scan end position, and the flow then returns to step S612. Note that the scan interval is set in step S604 or S606, or in step S621 to be described later.

In step S617, a maximum one of the focus evaluation values stored in the work memory 126 in step S612 is extracted, and the focus lens position associated using the same data acquisition index as that of the extracted focus evaluation value, i.e., the focus lens position indicating the peak of the focus evaluation value, is calculated.

It is checked in step S618 if the scan execution count is equal to the total scan count set in step S603 or S605. If YES in step S618, the flow advances to step S619; otherwise, the flow advances to step S620.

In step S619, the focus lens 101 is moved to the peak position calculated in step S617, thus ending the process.

In step S620, the state of SW2 is checked. If SW2 is ON, the flow advances to step S619; otherwise, the flow advances to step S621.

In step S621, the scan interval is set to be S3. The method of setting S3 is also the same as that described in the first embodiment using FIG. 6. In step S622, the scan start position is set to be PS2. In step S623, the scan end position is set to be PE2. The method of setting PS2 and PE2 is also the same as that described in the first embodiment using FIG. 6. In step S624, the scan execution count is incremented by 1, and the flow returns to step S610.

By executing the process, as described using the flow charts of FIGS. 7 and 8, when SW1 is turned on to execute the photographing process, and the AF operation starts, the state of SW2 is detected upon starting the AF operation. At this time, whether the scan is made once or twice is set in correspondence with the state of SW2. This is the same as that described in the first embodiment.

At this time, if SW2 is ON, the scan is made once, the focus peak position is calculated from the focus evaluation value obtained by that scan, and the focus lens 101 is moved to that position, thus ending the AF operation.

On the other hand, if SW2 is not ON, two scans are set, and the focus peak position is calculated from the focus evaluation value obtained upon completion of the first scan. Before the second scan starts, the state of SW2 is detected again. If SW2 is ON, the second scan is skipped, and the focus lens 101 is moved to the peak position obtained by the first scan, thus ending the AF operation. If SW2 is not ON, the second scan starts.

With this control, when SW2 is turned on during the scan after the AF operation has started, the AF operation is completed without making the second scan. Hence, the time required for the AF operation can be shortened, and a quick photographing operation can be consequently made.

(Third Embodiment)

In the above description, the state of SW2 is checked upon completion of the first scan. If SW2 is ON, the second scan is skipped. Alternatively, the state of SW2 may be checked during the first scan. The operation of such embodiment will be described below.

Figure 9:
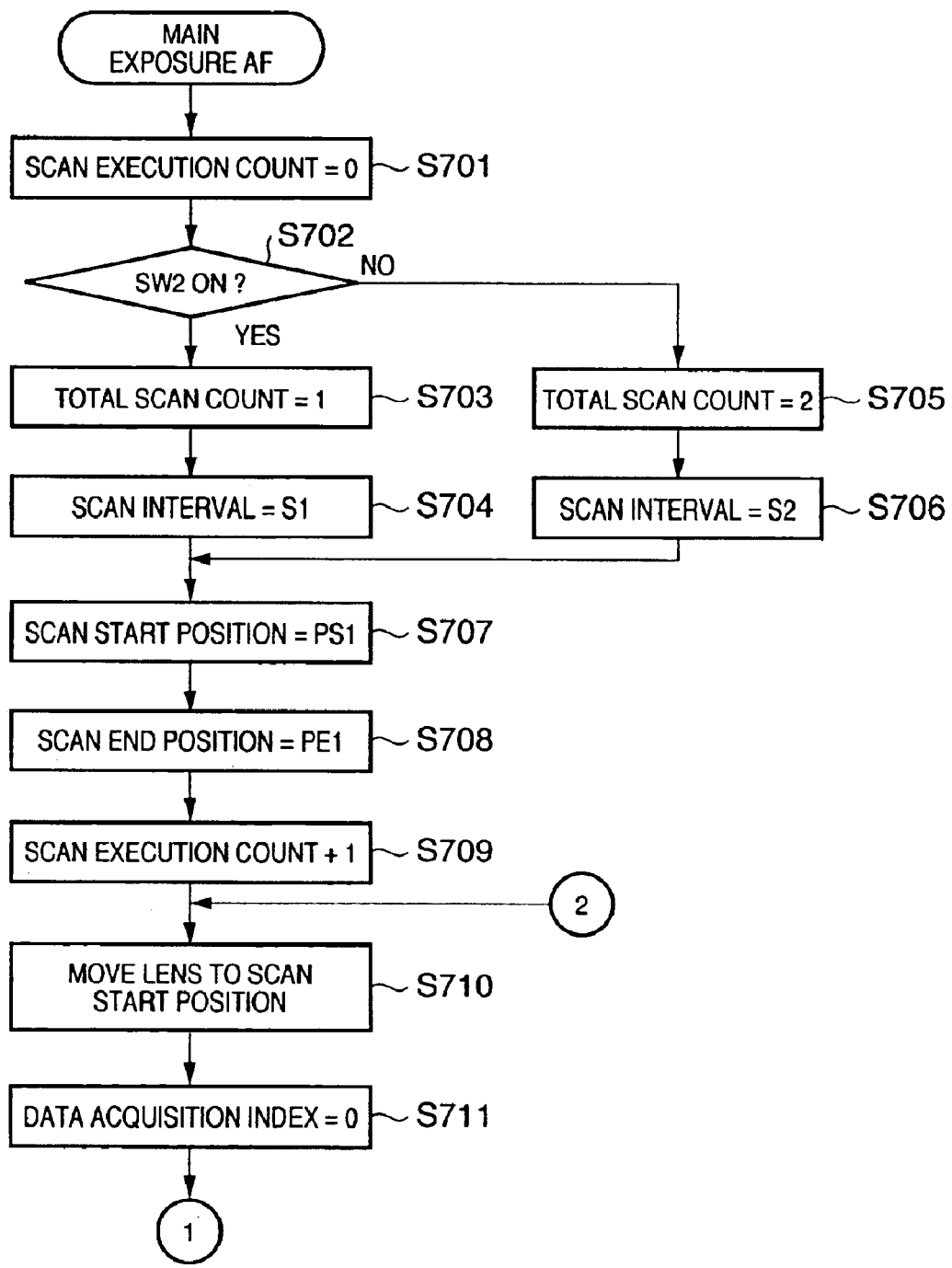
FIG. 9 is a flow chart showing an AF operation for main exposure according to the third embodiment.
Figure 10:
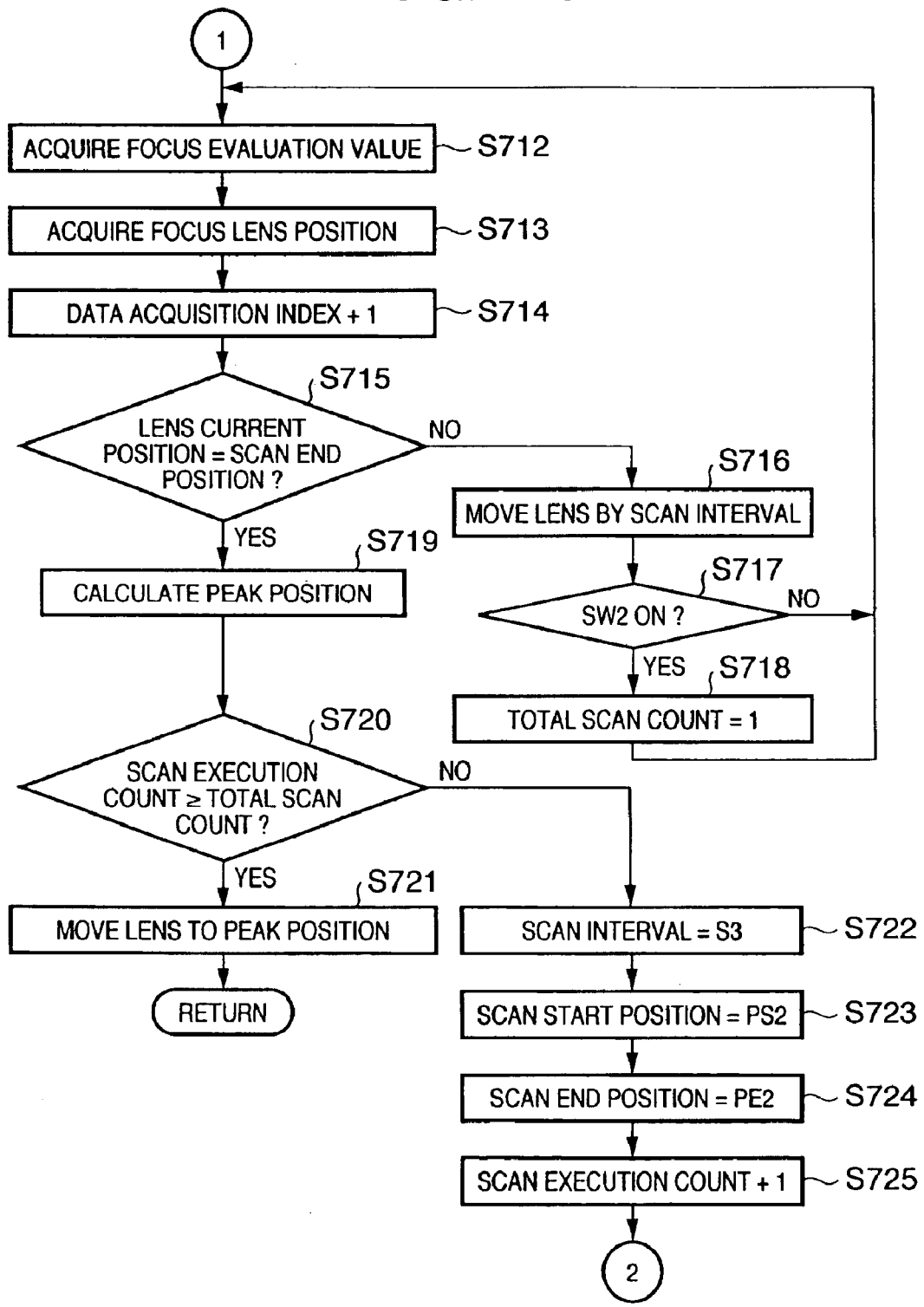
FIG. 10 is a flow chart showing an AF operation for main exposure according to the third embodiment.

FIGS. 9 and 10 are flow charts for explaining the main exposure AF operation in step S302 in FIG. 3. In step S701, a scan execution count is reset to zero. Note that the scan execution count indicates the order of the current scan in a plurality of scans as well as that set in step S401 in FIGS. 4 and 5 in the first embodiment.

In step S702, the state of SW2 is checked. If SW2 is ON, the flow advances to step S703; otherwise, the flow advances to step S705.

In step S703, a total scan count is set to be 1. Note that the total scan count indicates the number of scans executed per AF operation as well as that set in step S403 in FIGS. 4 and 5 in the first embodiment. In step S704, a scan interval is set to be S1. The method of setting S1 is the same as that described in the first embodiment using FIG. 6.

In step S705, the total scan count is set to be 2. In step S706, the scan interval is set to be S2. The method of setting S2 is also the same as that described in the first embodiment using FIG. 6.

In step S707, a scan start position is set to be PSI. In step S708, a scan end position is set to be PE1. The method of setting PSI and PE1 is the same as that described in the first embodiment using FIG. 6. In step S709, the scan execution count is incremented by 1.

In step S710, the focus lens 101 is moved to the scan start position. Note that the scan start position is PSI set in step S707 or PS2 to be set in step S723 to be described later.

In step S711, a data acquisition index is re-set to zero. Note that the data acquisition index indicates a data acquisition count, and the order of acquired data as well as that described in step S411 in FIGS. 4 and 5 in the first embodiment.

A description will continue with reference to FIG. 10. In step S712, the A/D converter 113 converts an analog video signal read out from the image sensing element 112 into a digital signal. The image processor 115 extracts a high-frequency component of a luminance signal from the output from the A/D converter 113, and stores it as a focus evaluation value in the work memory 126.

In step S713, the current position of the focus lens 101 is acquired, and is stored in the work memory 126.

In step S714, the data acquisition index is incremented by 1. The data of the focus evaluation value acquired in step S712 and the focus lens position acquired in step S713 are stored in association with the data acquisition index. For example, the focus evaluation value acquired at the third acquisition timing is that at the focus lens position acquired at the third acquisition timing, and the data acquisition index at that time is 3.

It is checked in step S715 if the current position of the focus lens 101 is equal to the scan end position. If YES in step S715, the flow advances to step S719; otherwise, the flow advances to step S716. Note that the scan end position is PE1 set in step S708 or PE2 to be set in step S724 to be described later.

In step S716, the focus lens 101 is moved by the scan interval toward the scan end position, and the flow advances to step S717. Note that the scan interval is set in step S704 or S706, or in step S722 to be described later.

In step S717, the state of SW2 is checked. If SW2 is ON, the flow advances to step S718; otherwise, the flow returns to step S712.

In step S718, the total scan count is set to be 1.

In step S719, a maximum one of the focus evaluation values stored in the work memory 126 in step S712 is extracted, and the focus lens position associated using the same data acquisition index as that of the extracted focus evaluation value, i.e., the focus lens position indicating the peak of the focus evaluation value, is calculated.

It is checked in step S720 if the scan execution count is equal to or larger than the total scan count set in step S703, S705, or S718. If YES in step S720, the flow advances to step S721; otherwise, the flow advances to step S722.

In step S721, the focus lens 101 is moved to the peak position calculated in step S719, thus ending the process.

In step S722, the scan interval is set to be S3. The method of setting S3 is also the same as that described in the first embodiment using FIG. 6. In step S723, the scan start position is set to be PS2. In step S724, the scan end position is set to be PE2. The method of setting PS2 and PE2 is also the same as that described in the first embodiment using FIG. 6. In step S725, the scan execution count is incremented by 1, and the flow returns to step S710.

By executing the process, as described using the flow charts of FIGS. 9 and 10, when SW1 is turned on to execute the photographing process, and the AF operation starts, the state of SW2 is detected upon starting the AF operation. At this time, whether the scan is made once or twice is set in correspondence with the state of SW2. This is the same as that described in the first embodiment.

At this time, if SW2 is ON, the scan is made once, the focus peak position is calculated from the focus evaluation value obtained by that scan, and the focus lens 101 is moved to that position, thus ending the AF operation.

On the other hand, if SW2 is not ON, two scans are set, and the first scan starts. During the first scan, the state of SW2 is detected. If SW2 is ON, the total scan count which is set to be 2 is re-set to be 1. The focus peak position is calculated from the focus evaluation value obtained upon completion of the first scan. After that, the second scan is skipped, and the focus lens 101 is moved to the peak position obtained by the first scan, thus ending the AF operation. If SW2 is not ON during the first scan, the second scan starts.

With this control, even when SW2 is ON during the first scan after the AF operation has started, the AF operation is completed without making the second scan. Hence, the time required for the AF operation can be shortened, and a quick photographing operation can be consequently made.

(Fourth Embodiment)

In the above description, the state of SW2 is checked during the first scan. Alternatively, when SW2 is ON, the scan interval in the subsequent scan may be changed. The operation of such embodiment will be described below.

Figure 11:
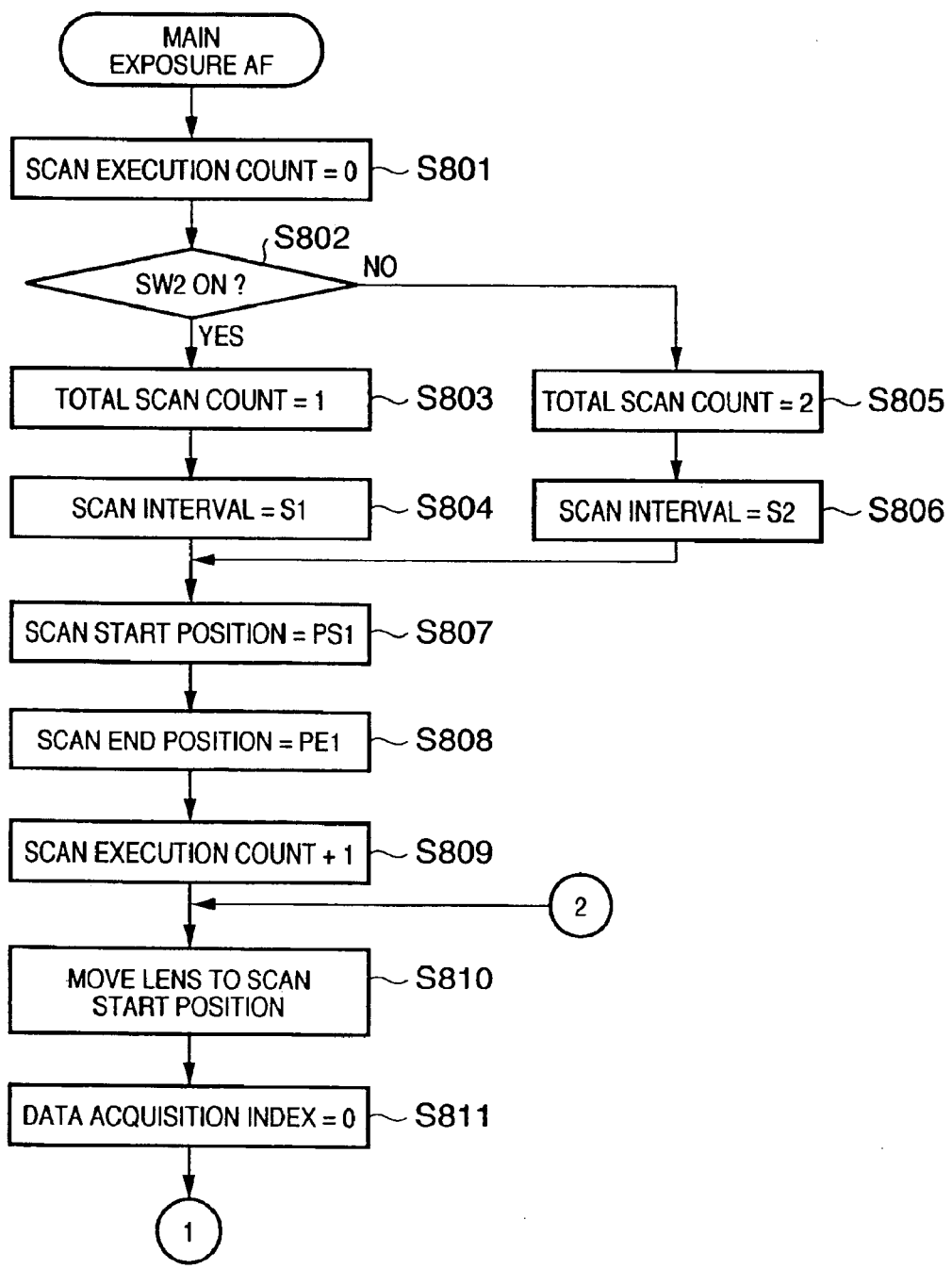
FIG. 11 is a flow chart showing an AF operation for main exposure according to the fourth embodiment.
Figure 12:
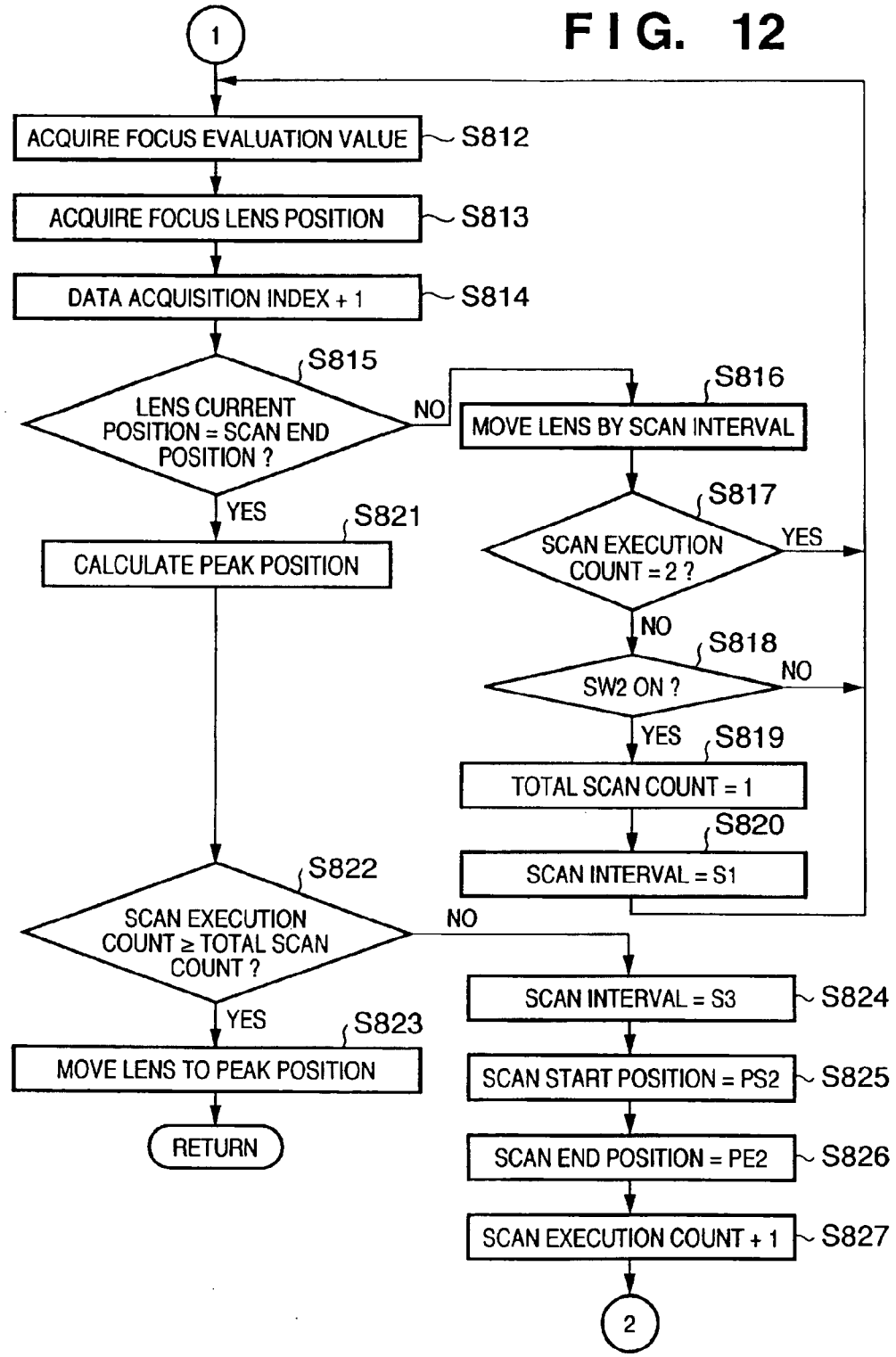
FIG. 12 is a flow chart showing an AF operation for main exposure according to the fourth embodiment.

FIGS. 11 and 12 are flow charts for explaining the main exposure AF operation in step S302 in FIG. 3. In step S801, a scan execution count is reset to zero. Note that the scan execution count indicates the order of the current scan in a plurality of scans as well as that set in step S401 in FIGS. 4 and 5 in the first embodiment.

In step S802, the state of SW2 is checked. If SW2 is ON, the flow advances to step S803; otherwise, the flow advances to step S805.

In step S803, a total scan count is set to be 1. Note that the total scan count indicates the number of scans executed per AF operation as well as that set in step S403 in FIGS. 4 and 5 in the first embodiment. In step S804, a scan interval is set to be S1. The method of setting S1 is the same as that described in the first embodiment using FIG. 6.

In step S805, the total scan count is set to be 2. In step S806, the scan interval is set to be S2. The method of setting S2 is also the same as that described in the first embodiment using FIG. 6.

In step S807, a scan start position is set to be PS1. In step S808, a scan end position is set to be PE1. The method of setting PS1 and PE1 is the same as that described in the first embodiment using FIG. 6.

In step S809, the scan execution count is incremented by 1. In step S810, the focus lens 101 is moved to the scan start position. Note that the scan start position is PS1 set in step S807 or PS2 to be set in step S825 to be described later.

In step S811, a data acquisition index is reset to zero. Note that the data acquisition index indicates a data acquisition count, and the order of acquired data as well as that described in step S411 in FIGS. 4 and 5 in the first embodiment.

A description will continue with reference to FIG. 12. In step S812, the A/D converter 113 converts an analog video signal read out from the image sensing element 112 into a digital signal. The image processor 115 extracts a high-frequency component of a luminance signal from the output from the A/D converter 113, and stores it as a focus evaluation value in the work memory 126.

In step S813, the current position of the focus lens 101 is acquired, and is stored in the work memory 126.

In step S814, the data acquisition index is incremented by 1. The data of the focus evaluation value acquired in step S812 and the focus lens position acquired in step S813 are stored in association with the data acquisition index. For example, the focus evaluation value acquired at the third acquisition timing is that at the focus lens position acquired at the third acquisition timing, and the data acquisition index at that time is 3.

It is checked in step S815 if the current position of the focus lens 101 is equal to the scan end position. If YES in step S815, the flow advances to step S821; otherwise, the flow advances to step S816. Note that the scan end position is PE1 set in step S808 or PE2 to be set in step S826 to be described later.

In step S816, the focus lens 101 is moved by the scan interval toward the scan end position, and the flow advances to step S817. Note that the scan interval is set in step S804 or S806, or in step S820 or S824 to be described later.

It is checked in step S817 if the scan execution count is 2. If YES in step S817, the flow returns to step S812; otherwise, the flow advances to step S818. In step S818, the state of SW2 is checked. If SW2 is ON, the flow advances to step S819; otherwise, the flow returns to step S812.

In step S819, the total scan count is set to be 1. In step S820, the scan interval is set to be S1. This S1 is the same as that set in step S804.

In step S821, a maximum one of the focus evaluation values stored in the work memory 126 in step S812 is extracted, and the focus lens position associated using the same data acquisition index as that of the extracted focus evaluation value, i.e., the focus lens position indicating the peak of the focus evaluation value, is calculated.

It is checked in step S822 if the scan execution count is equal to or larger than the total scan count set in step S803, S805, or S819. If YES in step S822, the flow advances to step S823; otherwise, the flow advances to step S824.

In step S823, the focus lens 101 is moved to the peak position calculated in step S821, thus ending the process.

In step S824, the scan interval is set to be S3. The method of setting S3 is also the same as that described in the first embodiment using FIG. 6. In step S825, the scan start position is set to be PS2. In step S826, the scan end position is set to be PE2. The method of setting PS2 and PE2 is also the same as that described in the first embodiment using FIG. 6. In step S827, the scan execution count is incremented by 1, and the flow returns to step S810.

By executing the process, as described using the flow charts of FIGS. 11 and 12, when SW1 is turned on to execute the photographing process, and the AF operation starts, the state of SW2 is detected upon starting the AF operation. At this time, whether the scan is made once or twice is set in correspondence with the state of SW2. This is the same as that described in the first embodiment.

At this time, if SW2 is ON, the scan is made once, the focus peak position is calculated from the focus evaluation value obtained by that scan, and the focus lens 101 is moved to that position, thus ending the AF operation.

On the other hand, if SW2 is not ON, two scans are set, and the first scan starts. During the first scan, the state of SW2 is detected. If SW2 is ON, the total scan count which is set to be 2 is re-set to be 1. Furthermore, the scan interval which is set to be S2 is set to be S1. That is, the scan interval, which is set to be large to make the first one of two scans at the beginning of the scan, is narrowed after SW2 is ON, thus continuing the first scan. In this way, since the small scan interval is set in the distance measurement range after SW2 is ON, the focusing precision can be improved. The focus peak position is calculated from the focus evaluation value obtained upon completion of the first scan. After that, the second scan is skipped, and the focus lens 101 is moved to the peak position obtained by the first scan, thus ending the AF operation. If SW2 is not ON during the first scan, the second scan starts.

In this way, even when SW2 is ON during the first scan after the AF operation has started, the AF operation is completed without making the second scan. Hence, the time required for the AF operation can be shortened, and a quick photographing operation can be consequently made. Furthermore, since the scan interval after SW2 is ON is re-set to be smaller than that set so far, the focusing precision can be improved even by a single scan.

When SW2 is ON during the first scan, the scan interval is re-set to be S1. In this case, the scan interval may be re-set to be that larger or smaller than S1. Even in such case, the interval smaller than S2 is set.

(Fifth Embodiment)

In the above description, the state of SW2 is checked during the first scan. When SW2 is ON, the first scan is completed, and the second scan is skipped. Alternatively, the AF operation may be aborted at the ON timing of SW2. The operation of such embodiment will be described below.

Figure 13:
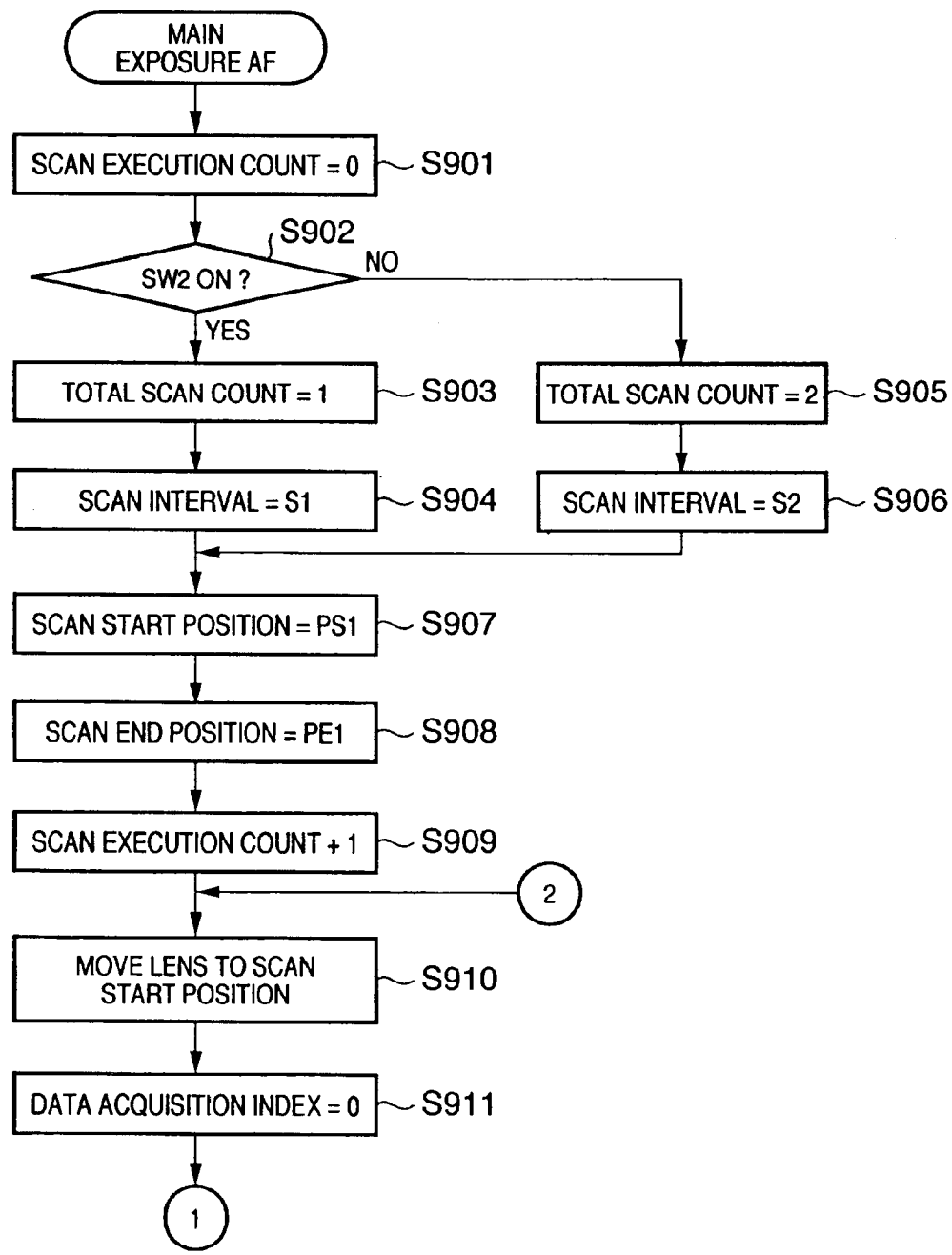
FIG. 13 is a flow chart showing an AF operation for main exposure according to the fifth embodiment.
Figure 14:
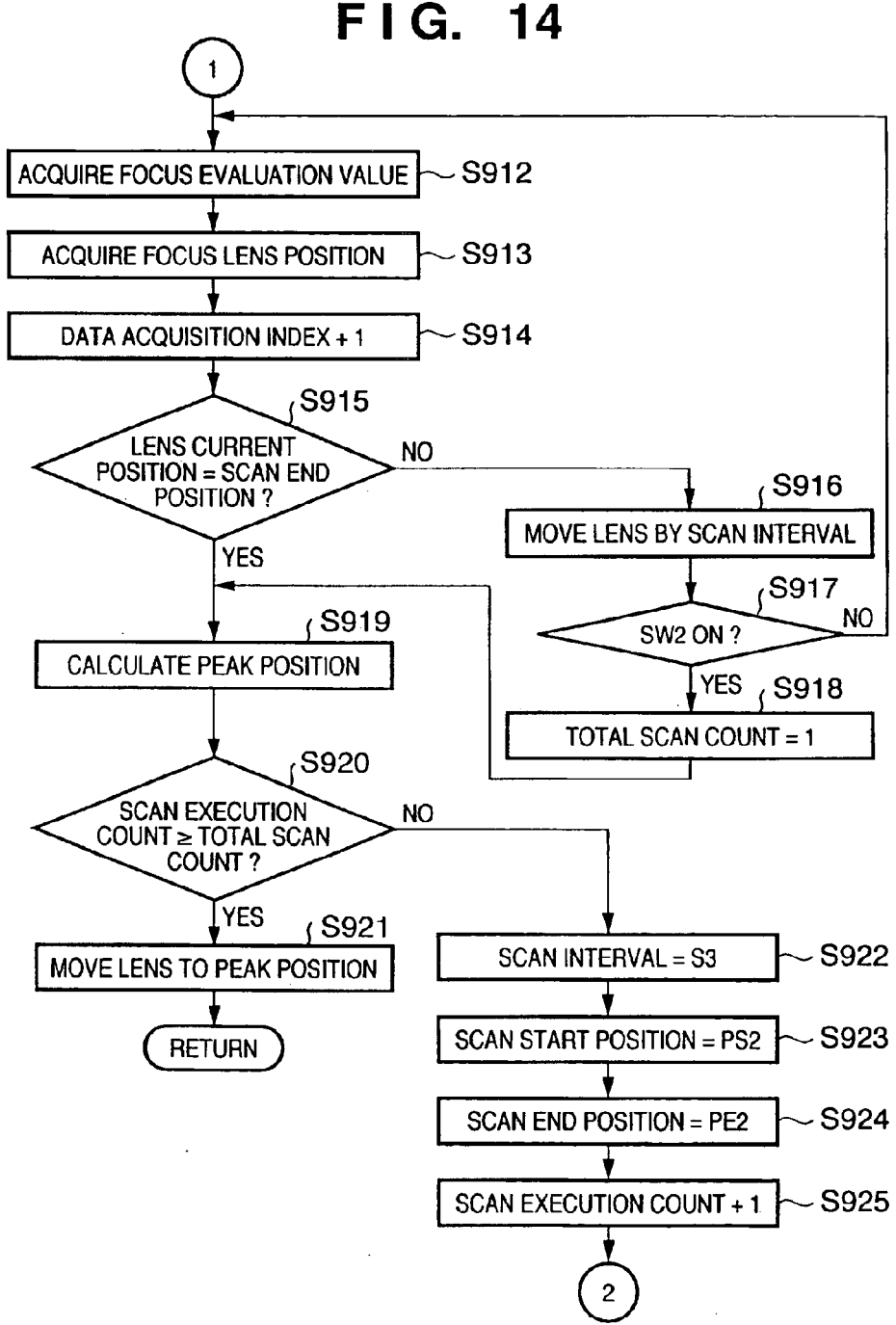
FIG. 14 is a flow chart showing an AF operation for main exposure according to the fifth embodiment.
Figure 16:
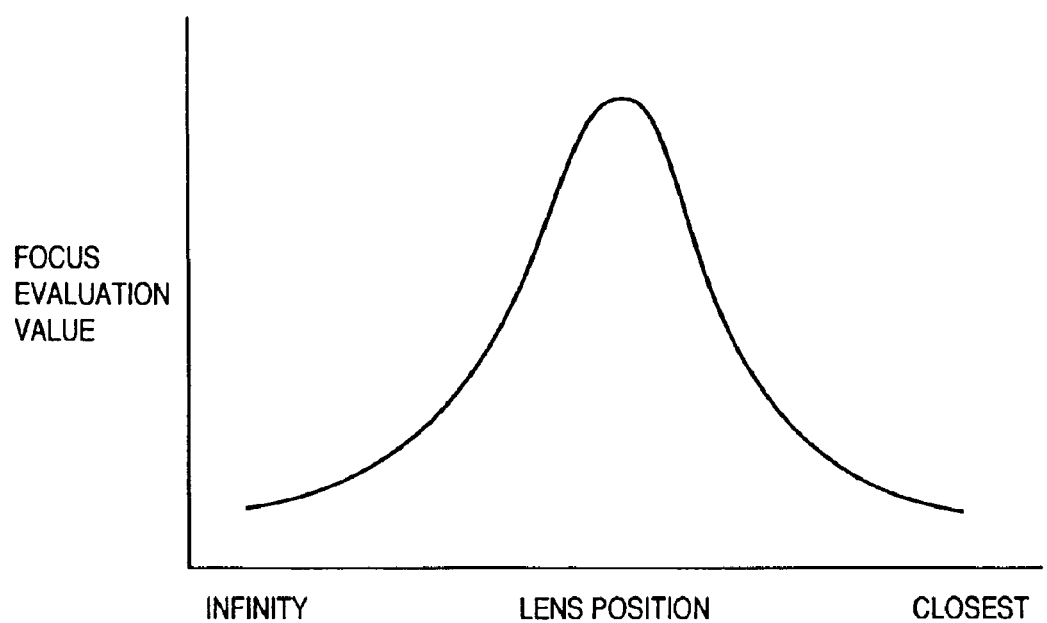
FIG. 16 is a graph showing the relationship between the focus lens position and focus evaluation value.

FIGS. 13 and 14 are flow charts for explaining the main exposure AF operation in step S302 in FIG. 3. In step S901, a scan execution count is reset to zero. Note that the scan execution count indicates the order of the current scan in a plurality of scans as well as that set in step S401 in FIGS. 4 and 5 in the first embodiment.

In step S902, the state of SW2 is checked. If SW2 is ON, the flow advances to step S903; otherwise, the flow advances to step S905.

In step S903, a total scan count is set to be 1. Note that the total scan count indicates the number of scans executed per AF operation as well as that set in step S403 in FIGS. 4 and 5 in the first embodiment. In step S904, a scan interval is set to be S1. The method of setting S1 is the same as that described in the first embodiment using FIG. 6.

In step S905, the total scan count is set to be 2. In step S906, the scan interval is set to be S2. The method of setting S2 is also the same as that described in the first embodiment using FIG. 6.

In step S907, a scan start position is set to be PS1. In step S908, a scan end position is set to be PE1. The method of setting PS1 and PE1 is the same as that described in the first embodiment using FIG. 6. In step S909, the scan execution count is incremented by 1.

In step S910, the focus lens 101 is moved to the scan start position. Note that the scan start position is PS1 set in step S907 or PS2 to be set in step S923 to be described later.

In step S911, a data acquisition index is reset to zero. Note that the data acquisition index indicates a data acquisition count, and the order of acquired data as well as that described in step S411 in FIGS. 4 and 5 in the first embodiment.

A description will continue with reference to FIG. 14. In step S912, the A/D converter 113 converts an analog video signal read out from the image sensing element 112 into a digital signal. The image processor 115 extracts a high-frequency component of a luminance signal from the output from the A/D converter 113, and stores it as a focus evaluation value in the work memory 126.

In step S913, the current position of the focus lens 101 is acquired, and is stored in the work memory 126.

In step S914, the data acquisition index is incremented by 1. The data of the focus evaluation value acquired in step S912 and the focus lens position acquired in step S913 are stored in association with the data acquisition index. For example, the focus evaluation value acquired at the third acquisition timing is that at the focus lens position acquired at the third acquisition timing, and the data acquisition index at that time is 3.

It is checked in step S915 if the current position of the focus lens 101 is equal to the scan end position. If YES in step S915, the flow advances to step S919; otherwise, the flow advances to step S916. Note that the scan end position is PE1 set in step S908 or PE2 to be set in step S924 to be described later.

In step S916, the focus lens 101 is moved by the scan interval toward the scan end position, and the flow advances to step S917. Note that the scan interval is set in step S904 or S906, or in step S922 to be described later.

In step S917, the state of SW2 is checked. If SW2 is ON, the flow advances to step S918; otherwise, the flow returns to step S912.

In step S918, the total scan count is set to be 1. After that, the flow advances to step S919.

In step S919, a maximum one of the focus evaluation values stored in the work memory 126 in step S912 is extracted, and the focus lens position associated using the same data acquisition index as that of the extracted focus evaluation value, i.e., the focus lens position indicating the peak of the focus evaluation value, is calculated.

It is checked in step S920 if the scan execution count is equal to or larger than the total scan count set in step S903, S905, or S918. If YES in step S920, the flow advances to step S921; otherwise, the flow advances to step S922.

In step S921, the focus lens 101 is moved to the peak position calculated in step S919, thus ending the process.

In step S922, the scan interval is set to be S3. The method of setting S3 is also the same as that described in the first embodiment using FIG. 6.

In step S923, the scan start position is set to be PS2. In step S924, the scan end position is set to be PE2. The method of setting PS2 and PE2 is also the same as that described in the first embodiment using FIG. 6.

In step S925, the scan execution count is incremented by 1, and the flow returns to step S910.

By executing the process, as described using the flow charts of FIGS. 13 and 14, when SW1 is turned on to execute the photographing process, and the AF operation starts, the state of SW2 is detected upon starting the AF operation. At this time, whether the scan is made once or twice is set in correspondence with the state of SW2. This is the same as that described in the first embodiment.

At this time, if SW2 is ON, the scan is made once, the focus peak position is calculated from the focus evaluation value obtained by that scan, and the focus lens 101 is moved to that position, thus ending the AF operation.

On the other hand, if SW2 is not ON, two scans are set, and the first scan starts. During the first scan, the state of SW2 is detected. If SW2 is ON during the first scan, the total scan count which is set to be 2 is re-set to be 1. At this time, the scan is aborted, the peak position is calculated using the obtained focus evaluation value, and the focus lens 101 is moved to the calculated peak position. In this way, even during the scan, a photographing operation can be immediately started at the ON timing of SW2. At this time, when the focus evaluation value at the primary focus peak position has been obtained during the scan made before SW2 is ON, the focus lens can be accurately brought into focus on an object. Even when the focus evaluation value at the primary focus peak position has not been obtained, the peak position is calculated from the obtained focus evaluation values. Hence, a position which is closest to an in-focus position is calculated. Hence, this embodiment is effective when quick photographing is more important than the focusing precision.

(Another Embodiment)

The scope of the present invention includes an embodiment which is implemented by supplying a program code of software that implements the functions of the embodiments to a computer (or a CPU or MPU) in a system or apparatus connected to various devices, and making the computer in the system or apparatus operate the various devices in accordance with the stored program, so as to operate the various devices for the purpose of implementing the functions of the embodiments.

In this case, the program code itself implements the functions of the embodiments, and the program code itself constitutes the present invention. As a transmission medium of that program code, a communication medium (a wired line such as an optical fiber or the like, a wireless line, or the like) in a computer network (a LAN, WAN such as the Internet, wireless communication network, or the like) system used to transmit and supply program information as a carrier wave can be used.

Furthermore, means for supplying the program code to the computer, e.g., a recording medium that stores the program code constitutes the present invention. As the recording medium for storing such program code, for example, a flexible disk, hard disk, optical disk, magneto-optical disk, CD-ROM, magnetic tape, nonvolatile memory card, ROM, and the like may be used.

The program code is also included in the embodiment of the present invention not only when the functions of the embodiments are implemented by executing the supplied program code by the computer but also when the functions of the embodiments are implemented by collaboration of the program code and an OS (operating system) or another application software running on the computer.

Moreover, the program code is included in the present invention when the functions of the embodiments are implemented by executing some or all of actual processes by a CPU or the like arranged in a function extension board or a function extension unit, which is inserted in or connected to the computer, after the supplied program code is stored in a memory of the extension board or unit.

Note that the shapes and structures of respective units described in the above embodiment are merely examples upon practicing the present invention, and the technical scope of the present invention must not be limitedly interpreted by them. That is, various modifications of the present invention can be made without departing from the spirit and scope thereof.

As described above, according to the above embodiments, since the number of times of the scan operation is changed in correspondence with the state of an instruction device which instructs to start a photographing operation, optimal AF operations can be made in both a case that attaches an importance on the focusing precision, and a case that attaches an importance on quick photographing without requiring any complicated operations such as mode switching and the like.

When a plurality of scans are to be made, the state of the instruction device is detected upon completion of the first scan, and the number of scans is changed in correspondence with that state. Hence, a quick photographing operation can be made even during the AF operation.

Since the state of the instruction device is detected during the scan, and the number of scans is changed in correspondence with that state, a quick photographing operation can be made even during the AF operation.

Since the state of the instruction device is detected during the scan, and the number of scans and the scan interval are changed in correspondence with that state, a quick photographing operation can be made even during the AF operation, and the focusing precision can be improved.

Since the state of the instruction device is detected during the scan, and the scan is aborted in correspondence with that state, a quick photographing operation can be made even during the AF operation.

The present invention is not limited to the above embodiments and various changes and modifications can be made within the sprit and scope of the present invention. Therefore, to apprise the public of the scope of the present invention the following claims are made.

What is claimed is:

1. An automatic focusing apparatus comprising:
    a photoelectric conversion device which converts an object image formed by a focus lens, which is used to make focus adjustment of an object image, into an electrical signal;
    an extraction device which extracts a signal that corresponds toga high-frequency component of a luminance signal of an object from an output signal of said photoelectric conversion device; and
    a control device which makes a scan operation that stores outputs from said extraction device at predetermined positions while driving said focus lens and extracts a peak position where the stored output of said extraction device becomes maximum value, and drives said focus lens to the peak position obtained by the scan operation, wherein said control device changes the number of times of the scan operation in accordance with a state of an instruction device which instructs to start a photographing operation.

2. The apparatus according to claim 1, wherein when the state of the instruction device designates start of the photographing operation, the number of times of the scan operation is set to be smaller than the number of times of the scan operation when the state of the instruction device does not designate start of the photographing operation.

3. The apparatus according to claim 1, wherein an interval between the predetermined positions is changed in correspondence with the state of the instruction device.

4. The apparatus according to claim 3, wherein when the state of the instruction device designates start of the photographing operation, the step interval is set to be smaller than the interval when the state of the instruction device does not designate start of the photographing operation.

5. The apparatus according to claim 1, wherein the state of the instruction device is detected upon completion of the scan operation, and the number of times of the scan operation is changed in correspondence with the state of the instruction device.

6. The apparatus according to claim 5, wherein when the state of the instruction device designates start of the photographing operation, the number of times of the scan operation is set to be smaller than the number of times of the scan operation when the state of the instruction device does not designate start of the photographing operation.

7. The apparatus according to claim 1, wherein the state of the instruction device is detected during the scan operation, and the number of times of the scan operation is changed in correspondence with the state of the instruction device.

8. The apparatus according to claim 7, wherein when the state of the instruction device designates start of the photographing operation, the number of times of the scan operation is set to be smaller than the number of times of the scan operation when the state of the instruction device does not designate start of the photographing operation.

9. The apparatus according to claim 1, wherein the state of the instruction device is detected during the scan operation, and an interval between the predetermined position is changed in correspondence with the state of the instruction device.

10. The apparatus according to claim 9, wherein when the state of the instruction device designates start of the photographing operation, the interval is set to be smaller than the interval when the state of the instruction device does not designate start of the photographing operation.

11. The apparatus according to claim 1, wherein the state of the instruction device is detected during the scan operation, and the scan operation is ended in correspondence with the state of the instruction device.

12. A program for making an image recording apparatus execute an automatic focusing process, the image recording apparatus comprising a focus lens used to make focus adjustment of an object image, a focus lens drive device which drives the focus lens, a photoelectric conversion device which converts an object image formed by the focus lens into an electrical signal, an extraction device which extracts a signal that represents a high-frequency component of a luminance signal of an object from an output signal of the photoelectric conversion device, and an instruction device which instructs to start a photographing operation, the program comprising:

making a scan operation that stores outputs from the extraction device at predetermined positions while driving the focus lens, and extracts a peak position where the stored of the extraction device become maximum value, executing a process for driving the focus lens to the peak position obtained by the scan operation, and changing the number of times of the scan operation in accordance with a state of the instruction device.

13. A computer readable storage medium storing a program according to claim 12.

* * * * *